(12) United States Patent
Gustafson (10) Patent No.: US 7,002,454 B1
(45) Date of Patent: Feb. 21, 2006

(54) SYSTEM AND METHOD FOR WARNING AN OPERATOR OF A VEHICLE IF THE VEHICLE IS OPERATING IN A CONDITION THAT MAY RESULT IN DRIVE BELT FAILURE

(75) Inventor: Gary L. Gustafson, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 41 days.

(21) Appl. No.: 10/307,783

(22) Filed: Dec. 2, 2002

(51) Int. Cl.
 *B60Q 1/00* (2006.01)
(52) U.S. Cl. .................... 340/441; 340/438; 340/439; 340/425.5; 340/459
(58) Field of Classification Search ............... 340/441, 340/438, 439, 430, 425.5, 459; 701/93, 102, 701/104, 110, 54; 180/173; 474/14, 46, 474/70; 477/8, 9, 14, 46
See application file for complete search history.

(56) References Cited

U.S. PATENT DOCUMENTS

| 5,036,939 | A | | 8/1991 | Johnson et al. |
| 5,345,383 | A | * | 9/1994 | Vance .......................... 701/32 |
| 5,449,329 | A | * | 9/1995 | Brandon et al. ............... 477/70 |
| 5,896,083 | A | * | 4/1999 | Weisman et al. ............ 340/438 |
| 6,149,540 | A | | 11/2000 | Johnson et al. |
| 6,176,796 | B1 | | 1/2001 | Lislegard |
| 6,186,925 | B1 | * | 2/2001 | Bellinger ...................... 477/175 |
| 6,253,143 | B1 | | 6/2001 | Silvernagle |
| 2002/0033295 | A1 | | 3/2002 | Korenjak et al. |
| 2002/0094902 | A1 | | 7/2002 | Pollman |

* cited by examiner

*Primary Examiner*—Hung Nguyen
(74) *Attorney, Agent, or Firm*—Fredrikson & Byron, P.A.

(57) ABSTRACT

A system and method for warning an operator of a vehicle if the vehicle is operating in a condition that may result in drive belt failure. The ground speed of the vehicle, its engine speed and transmission gear placement are compared to determine if the engine speed is too high for a given ground speed and transmission gear placement. If it is too high, a warning is generated to alert the operator if the vehicle that the drive belt is in danger of failing.

34 Claims, 6 Drawing Sheets

SYSTEM AND METHOD FOR WARNING AN OPERATOR OF A VEHICLE IF THE VEHICLE IS OPERATING IN A CONDITION THAT MAY RESULT IN DRIVE BELT FAILURE

BACKGROUND OF THE INVENTION

Many All Terrain Vehicles (ATVs) and snowmobiles are equipped with belt-driven continuously variable transmissions. Continuously Variable Transmissions (CVTs) alleviate the need for the operator of the vehicle to shift the transmission as the vehicle accelerates through its range of speeds. As described in U.S. Pat. No. 6,176,796, CVTs are comprised of a drive clutch, a driven clutch, and drive belt, typically a V-belt, disposed about the clutches. The drive clutch is coupled to the engine drive shaft and the driven clutch is coupled to the vehicle's wheels on ATVs or endless track in the case of snowmobiles and is driven by the drive clutch though the drive belt. Each of the clutches are typically configured as a pair of opposed sheaves that rotate together about a common axis. Typically one sheave of each clutch is moveable axially while the other remains stationary. The movable sheaves thus move away from or towards the other sheave during operation of the vehicle.

The drive belt slides radially inward and outward along the inner faces of the sheaves during operation. The inner faces of the sheaves are angled such that they converge towards a center axis. In operation, as the axial distance between the sheaves increases, the drive belt moves inward toward the axis of rotation. Conversely, as the axial distance decreases, the drive belt moves outward toward the outer radius of the clutch. The sliding of the belt results from frictional forces. This friction creates a significant amount of heat. If this heat is not adequately removed from the sheaves, the belt can become quite hot and, under extreme conditions, the belt will burn, warp or fray and thereby fail or operate improperly.

Drive belts are more apt to fail under certain vehicle operating conditions. For example, the drive belt may be driven by the drive clutch yet spin or slide without moving the driven clutch. This conditions can occur when an operator applies full throttle even though the wheels on the vehicle are stuck or when the vehicle is towing a very heavy load. The increased throttle results in rotation of the drive clutch but the stuck wheels or the heavy load prevents rotation of the driven clutch. The drive belt absorbs the large difference in speeds by sliding relative to the stationary clutch which generates significant amount of heat that may result in belt failure.

Another scenario in which the drive belt is more apt to fail is if the vehicle is driven in the wrong gear. In addition to the CVT, ATVs often have a second type transmission consisting of traditional gears. The second transmission is usually located on the driven side of the CVT and may be shifted between High, Low, Reverse and Neutral. If the vehicle is mistakenly operated in High gear when conditions warrant Low gear operation, the load on the engine and on the CVT drive clutch increases. This increased load causes the drive belt to slip on the driven clutch resulting in extreme heat generation.

Thus it is desirable to provide a system and method of alerting an operator whenever the immediate operating conditions of the vehicle make a drive belt more prone to burning so that the operator can take preventative action.

SUMMARY OF THE INVENTION

According to a first aspect of the invention, there is provided a system for warning an operator of a vehicle if the vehicle is operating in a condition that may result in drive belt failure. The system includes a first sensor, a second sensor and a processor. The first sensor determines engine speed of the vehicle. The second sensor determines ground speed at which the vehicle is traveling. The processor compares the ground speed, engine speed and transmission gear placement to determine if the engine speed is too high for a given ground speed and transmission gear placement. The processor generates a warning signal on an output of the processor if the engine speed is too high.

According to a second aspect of the invention, there is provided a system for warning an operator of a vehicle if the vehicle is operating in a condition that may result in drive belt failure. The system includes means for determining engine speed of the vehicle, means for determining ground speed at which the vehicle is traveling, means for determining transmission gear placement of the vehicle, and means for comparing the ground speed, engine speed and transmission gear placement to determine if the engine speed is too high for a given ground speed and transmission gear placement and generating a warning signal if the engine speed is too high.

According to a third aspect of the invention, there is provided a system for warning an operator of a vehicle if the vehicle is operating in a condition that may result in drive belt failure. The system includes a first sensor, a second sensor, a signal processor and an indicator. The first sensor determines engine speed of the vehicle. The second sensor determines ground speed at which the vehicle is traveling. The signal processor is operatively coupled to the first and second sensors to receive outputs of the first and second sensors as inputs to the signal processor. The signal processor is programmed to compare the ground speed, engine speed and transmission gear placement to determine if the engine speed is too high for a given ground speed and the transmission gear placement. The signal processor generates a warning signal as an output of the signal processor if the engine speed is too high. The indicator is coupled to the output of the signal processor and is activated by the warning signal generated by the signal processor.

According to a fourth aspect of the invention, there is provided a method for warning an operator of a vehicle if the vehicle is operating in a condition that may result in drive belt failure. The method includes the steps of determining engine speed of the vehicle, determining ground speed at which the vehicle is traveling, determining placement of a transmission gear of the vehicle, and comparing the ground speed, engine speed and transmission gear placement to determine if the engine speed is too high for a given ground speed and transmission gear placement; and generating a warning if the engine speed is too high.

DETAILED DESCRIPTION OF THE PREFERRED EMBODIMENTS OF THE PRESENT INVENTION

Figure 1:
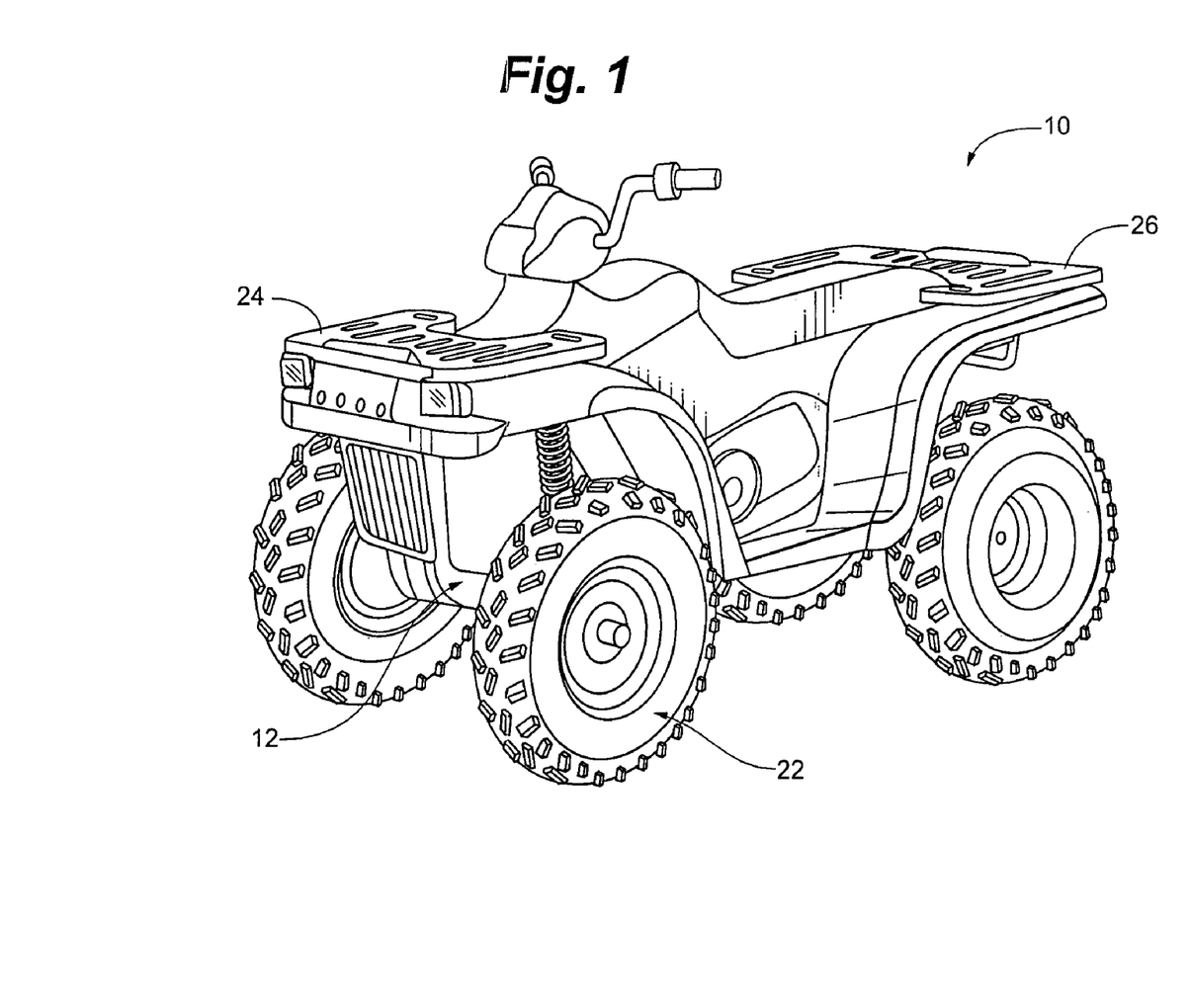
FIG. 1 is a perspective view of an ATV according to a preferred embodiment of the present invention.

FIG. 1 is a perspective view of an ATV according to a preferred embodiment of the present invention. An ATV 10 has a chassis 12 upon which is mounted an engine (not shown), a transmission system (not shown) including front and rear axles, and wheels 22. The ATV has a front and rear rack 24, 26 for carrying loads. An instrument cluster (see FIG. 6) is located on the chassis 12 where it can be viewed by the operator of the vehicle while operating the vehicle. While the invention is described with reference to an ATV, the invention is not so limited and can be used with snowmobiles or other vehicles that utilize CVTs.

Figure 2:
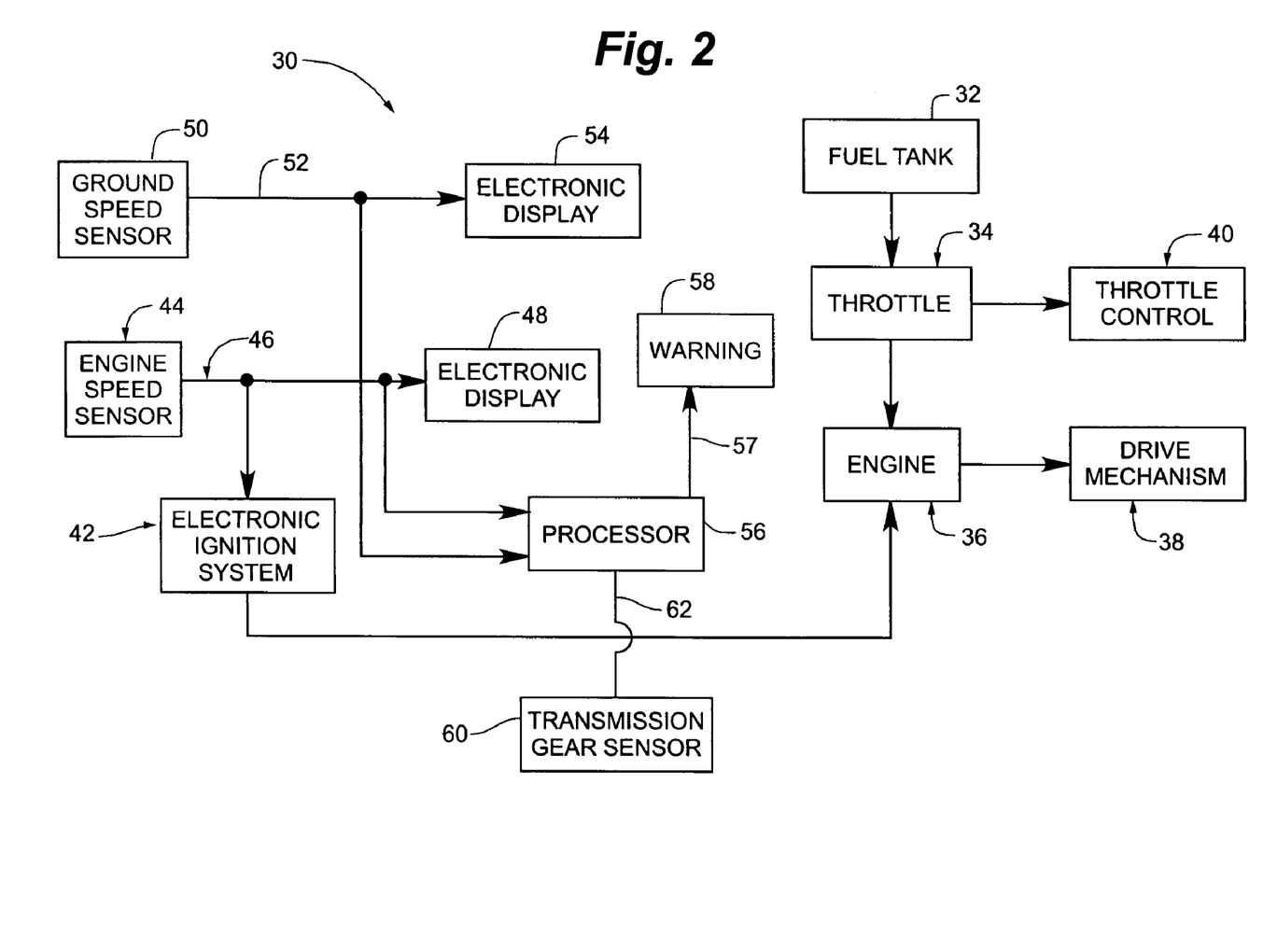
FIG. 2 is a block diagram of a portion of an engine configuration incorporating a warning system according to a preferred embodiment of the present invention.

FIG. 2 is a block diagram of a portion of an engine configuration 30 incorporating a warning system according to a preferred embodiment of the present invention. A fuel tank 32 is coupled to provide fuel to an engine 36 via a throttle 34. The engine 36 converts the fuel into power to drive the vehicle drive mechanism 38. The amount of power provided to the drive mechanism 38 may be governed by a vehicle operator using a throttle control 40. The engine configuration 30 shown in FIG. 2 utilizes an electronic ignition system 42 which provides an ignition signal to the engine 36. The conversion of fuel into drive power by the engine 36 depends upon timed ignition pulses from the electronic ignition system 42. To provide these ignition pulses, the electronic ignition system 42 relies on a signal from an engine speed or rpm sensor 44 which provides a signal indicative of the engine speed. In a preferred embodiment, the sensor 44 is located near the crankshaft, the magneto, or the camshaft in the engine, and the engine speed signal 46 is an electronic pulse train which is indicative of the position of the corresponding engine element. In a preferred embodiment, the engine speed sensor 44 reads the peaks of an AC waveform generated by a stator (not shown) of the engine. The sensor for measuring the engine's speed may be, for example, a Hall effect sensor, a variable reluctance sensor, or any other sensing technology. The engine speed signal 46 may also be provided to an electronic display 48 for a display of the engine's speed to the vehicle operator on the instrument cluster (see FIG. 6). Alternatively, engine speed can be monitored by monitoring ignition command pulses from the electronic ignition system 42, or by an inductive pick-up surrounding a spark plug wire or by counting the frequency of alternating current cycles being generated by a generator (not shown) of the engine and modifying the frequency by the known number of pulses per revolution of the generator.

Figure 6:
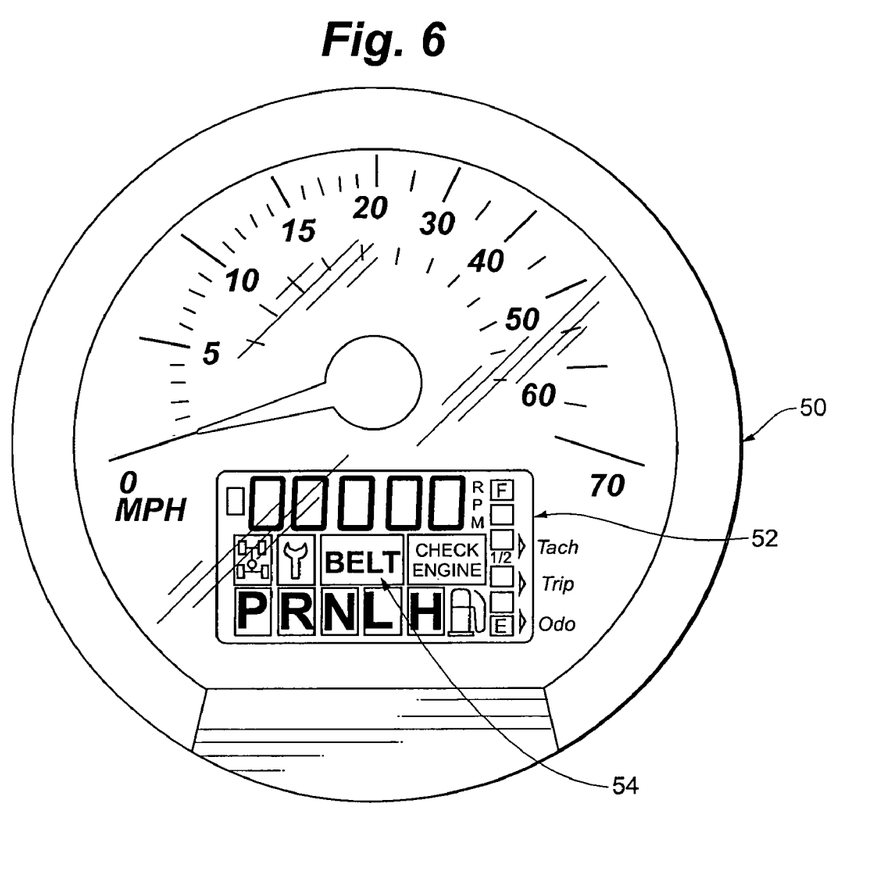
FIG. 6 is a multifunction speedometer display according to a preferred embodiment of the present invention.

In addition, a ground speed sensor 50 is included to provide an electronic pulse train 52 to an electronic display of the vehicle's ground speed to the vehicle operator on the instrument cluster (see FIG. 6). In a preferred embodiment, the ground speed sensor 50 is a Hall effect sensor located near a drive shaft, an axle, or wheel of the vehicle 10 and the ground speed signal 52 is indicative of the vehicle's ground speed. Other types of sensors may be used as those of ordinary skill in the art will appreciate.

A processor 56 receives as inputs the ground speed signal 52 and the engine speed signal 46. A transmission gear sensor 60 is also provided to determine the gear placement of the secondary transmission. The transmission gear sensor 60 provides a transmission gear signal 62 as an input to the processor 56. The processor compares the engine speed signal 46 reflecting the vehicle's engine speed against the ground speed signal 52 reflecting the vehicle's ground speed for a given transmission gear signal 62. This comparison is accomplished using a lookup table stored in a memory as will be described with reference to FIG. 3. If the processor 56 determines that the engine speed is too high for a given ground speed and the transmission gear placement is in High gear, it will generate a warning signal 57 at an output which is sent to a warning indicator 58 that may be located on the instrument cluster (see FIG. 6) of the vehicle as will be described in detail hereinafter. The warning indicator 58 is activated by the warning signal so as to alert the operator of the vehicle that the vehicle is operating in a condition that promotes belt failure.

The processor 56 in a preferred embodiment is housed physically within the instrument cluster, however, it need not necessarily be located there. It could be located in a discrete electronic module which is wired to monitor the ground and engine speeds. Thus, the location of the processor can vary as long as it can receive the engine, ground and transmission gear signals.

Figure 3:
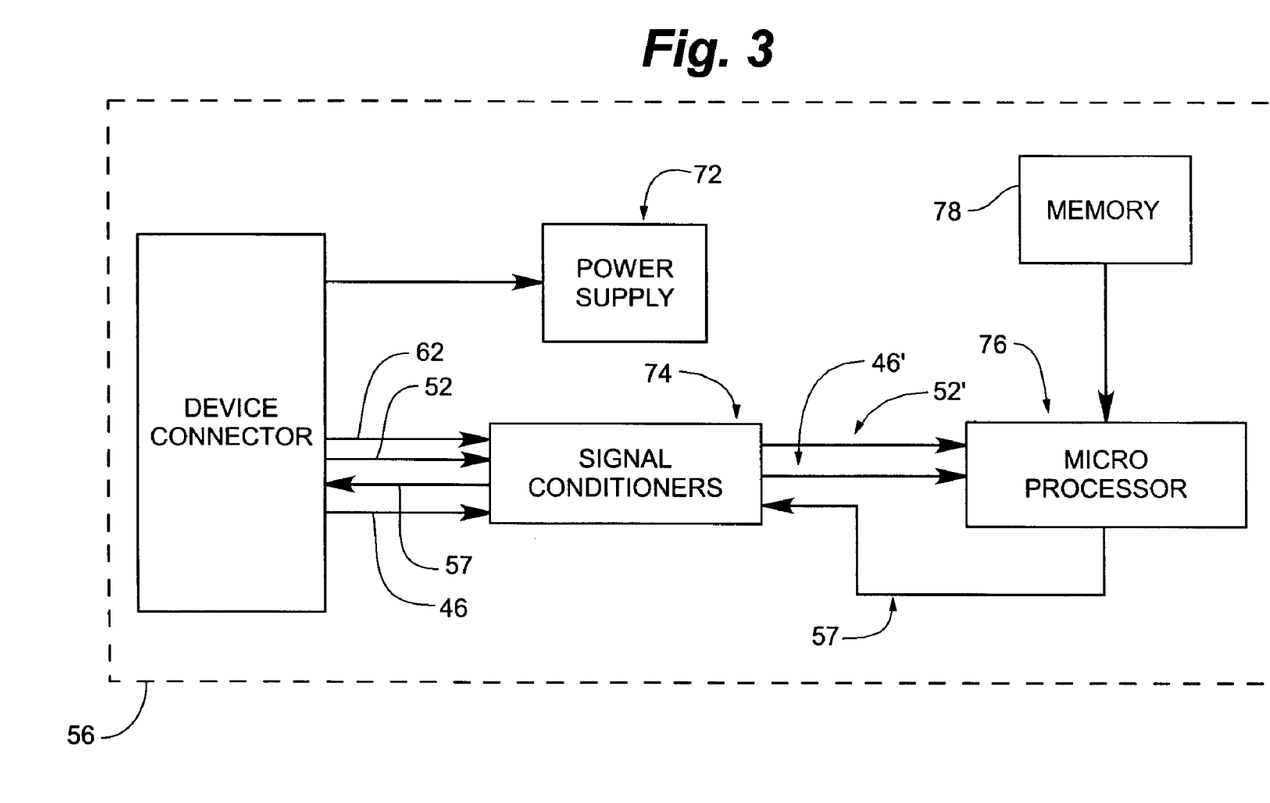
FIG. 3 is a block diagram of a processor used in the engine configuration shown in FIG. 2 according to a preferred embodiment of the present invention.

FIG. 3 is a block diagram of a processor 56 used in the engine configuration shown in FIG. 2 according to a preferred embodiment of the present invention. An electrical connector 70 supplies power voltages to a power supply 72. Power supply 72 provides power conversion and voltage regulation as needed, and supplies power to the rest of the components in the processor 56. Electrical connector 70 also provides the engine speed and ground speed signals 52, 46 respectively and transmission gear signal 62 to signal conditioners 74. The signal conditioners 74 provide protection against signal transients and filters the incoming signals to better approximate digital pulse waveforms. A microprocessor 76 processes the signals from the signal conditioners 74. Alternatively, the signal conditioners 74 may be omitted and the engine speed and ground speed signals 52, 46 and transmission gear signal 62 may be provide directly to the microprocessor. The microprocessor 76 process the signals from the sensors 44, 50 and 60 and determines, based upon a lookup chart 80 stored in memory 78, which will be described in detail hereinafter, whether to generate a warning signal 57.

Table 1 below is an example of a lookup table 80 that may be stored in memory 78.

TABLE 1

| RPM | SPEED (m.p.h.) |
|---|---|
| 2,000–3,000 | Less than 4 |
| 3,000–4,000 | Less than 5 |
| 4,000–5,000 | Less than 6 |
| 5,000–6,000 | Less than 7 |
| 6,000+ | Less than 8 |

The engine speed, RPM, is divided into segments. Each segment of the engine speed has a corresponding ground speed below which the drive belt is in danger of being burnt. This speed is also dependent upon the gear placement of the transmission. The microprocessor 76 compares the engine speed from the engine speed sensor 44 with the vehicle speed from the ground speed sensor 50 and determines if the engine speed is too high for the given vehicle speed and transmission gear. If this condition occurs, the processor 76 generates a warning signal 57. In a preferred embodiment, the warning signal 57 is sent through the signal conditioners 74 before being output to the warning indicator. In a preferred embodiment, the generation of the warning signal 57 is time delayed so that a warning signal is not generated during rapid acceleration or momentary wheel spin.

Figure 4:
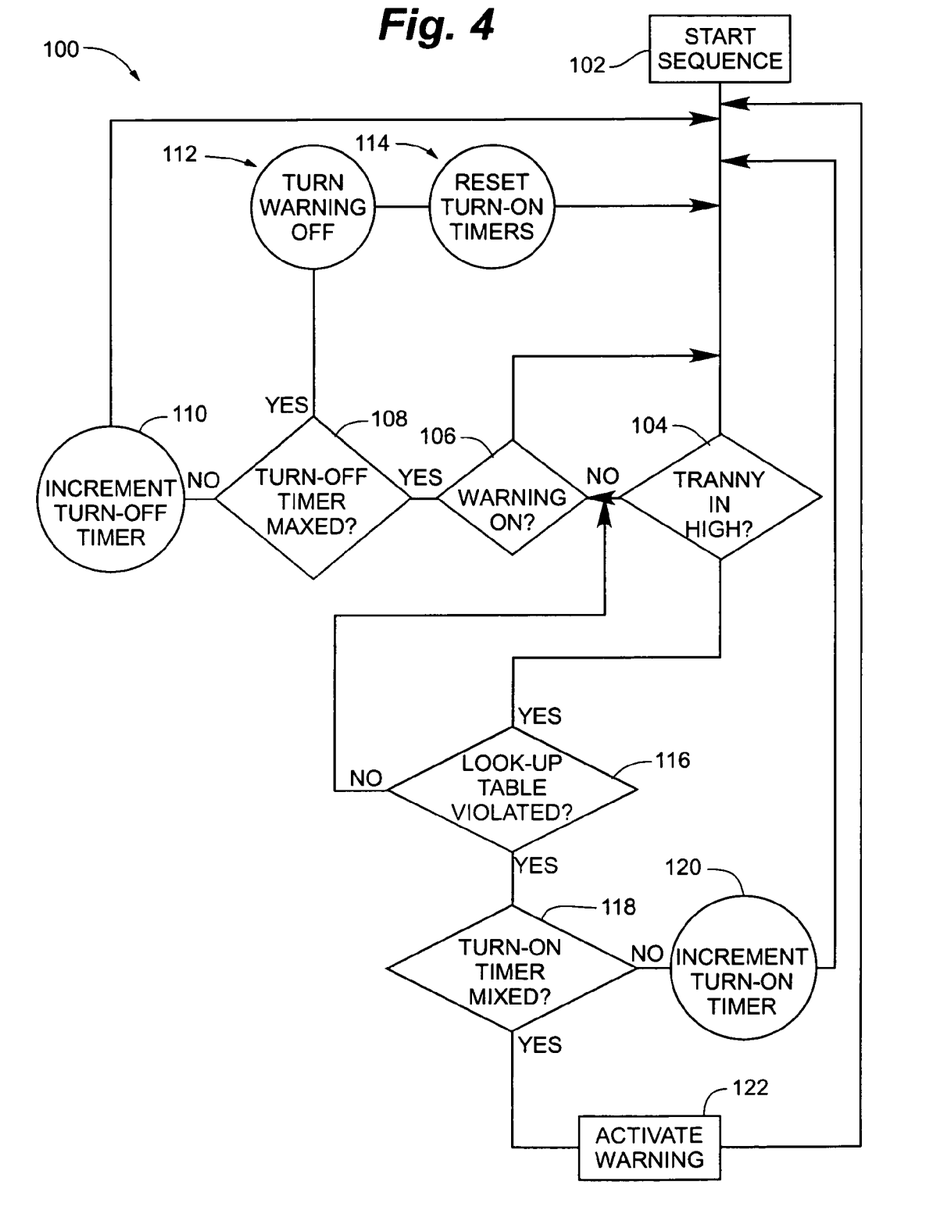
FIG. 4 is a flow chart illustrating the method implemented by the processor according to a preferred embodiment of the present invention.

FIG. 4 is a flow chart illustrating the method implemented by the processor according to a preferred embodiment of the present invention. The process begins at step 102. At decision step 104, the processor determines if the transmission gear is in a placement usually denoted as High.

If it is not, then at decision step 106, it is determined whether the warning signal is present. If it is not, control returns to step 104. If it is determined at step 106 that the warning signal is present, then at decision step 108 it is determined whether the turn-off timer has expired. If it has not, then the timer is incremented at step 110 and control is returned to decision step 104. If the turnoff timer has expired, then the warning signal is ceased at step 112, the turn-on and turn-off timers are reset at step 114, and control is then returned to decision step 104.

If at decision step 104 it was determined that the transmission gear is in High, then at decision step 116 it is determined whether the look-up table has been violated, i.e., is the measured speed of the vehicle below the range of acceptable speeds for the vehicle for the measured engine speed. If the table has not been violated, then control is passed to decision step 106. If the look-up table has been violated, then at decision step 118 it is determined whether the turn-on timer has expired. If it has not, the turn-on timer is incremented at step 120 and control is retuned to decision step 104. The turn-on timer provides the delay so that the warning is not generated for brief accelerations or momentary wheel spins. If it is determined at decision step 118 that the turn-on timer has expired, then the warning signal is generated at step 122 and control is returned to decision step 104.

Figure 5:
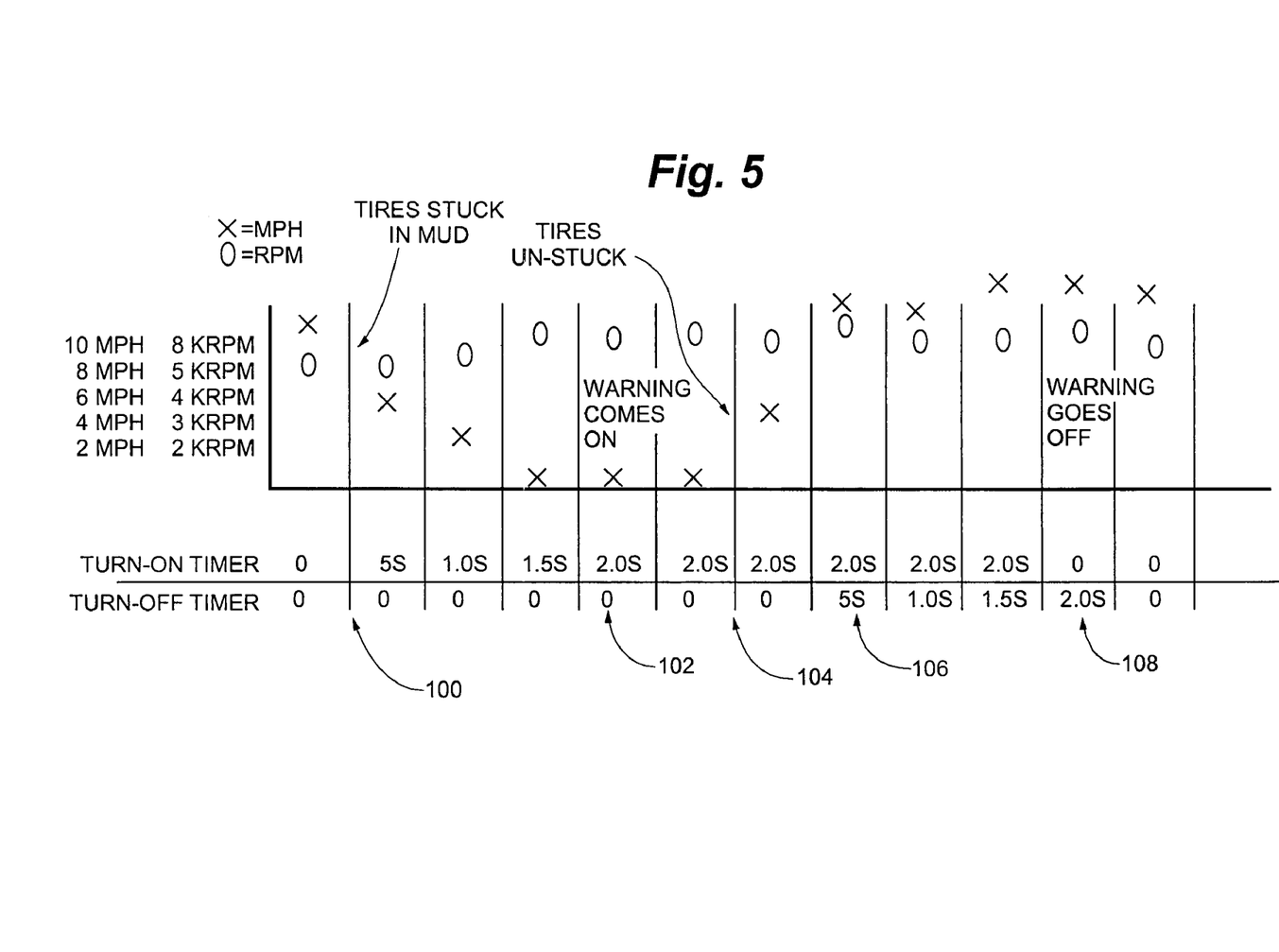
FIG. 5 is a graph illustrating the process implemented by the processor shown in FIG. 4.

FIG. 5 is a graph illustrating the method shown in FIG. 4 implemented by the processor. The example shown in FIG. 5 refers to an ATV getting its tires stuck in the mud. The engine and ground speeds are represented on the vertical axis with engine speed designated by "O" in RPM and ground speed represented by "X" in MPH. The duration of the turn-on timer and turn-off timer in seconds are represented along the horizontal axis. At the beginning, the ground speed exceeds the engine speed and the transmission gear is in High. The look-up table is not violated. Both the turn-on and turn-off timers are not activated at this point. At point 100, the tires of the vehicle get stuck in the mud. This causes the engine speed to exceed the ground speed of the vehicle in violation of the parameters set up in the look-up table. The turn-on timer is activated but has not expired at this point. The condition persists for 2 seconds when at point 102 the turn-on timer is maxed and a warning signal is generated by the processor. At point 104 the tires become unstuck and at point 106 the ground speed of the vehicle exceeds its engine speed. At that point, the turn-off timer is activated and, once it has expired at point 108, the warning signal is ceased and the turn-on and turn-off timers are reset.

Figure 7:
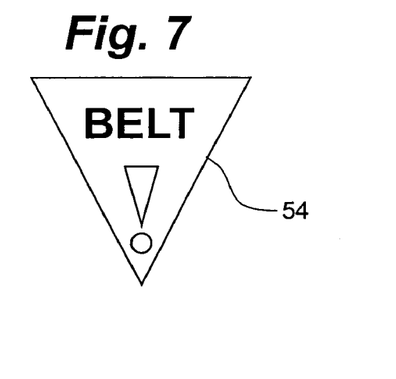
FIGS. 7 and 8 are views of discrete warning indicators according to other preferred embodiments of the present invention.
Figure 8:
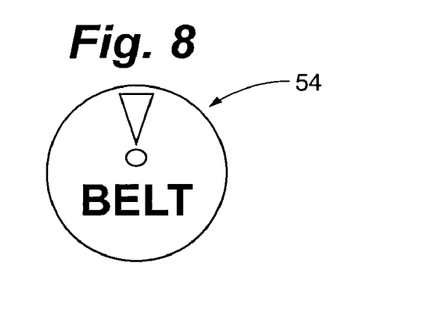

FIG. 6 is a view of an instrument cluster 50 according to a preferred embodiment of the present invention. In one preferred embodiment, the instrument cluster has a liquid crystal display 52 as shown in FIG. 6. A warning indicator 54 is incorporated into the liquid crystal display 52 as shown. The warning indicator 54 is activated by the generation of the warning signal. The warning signal activates an LCD driver which in turn powers the segment or segments in the Liquid Crystal Display. One other method of implementing the warning light is to include a translucent surface within the cluster with a warning icon printed over it. The warning icon is illuminated on command from the processor by an LED under the surface of the translucent area. Alternatively, the warning can be a discrete warning light mounted independently of the instrument cluster powered by an LED or incandescent lamp as shown in FIGS. 7 and 8. In a preferred embodiment, an alphanumeric display can be used.

While preferred embodiments of the present invention have been described, it should be understood that various changes, adaptations, and modifications may be made without departing from the spirit of the invention and the scope of the appended claims.

What is claimed is:

1. A system for warning an operator of a vehicle if the vehicle is operating in a condition that may result in drive belt failure, the system comprising:
   a first sensor for determining engine speed of the vehicle;
   a second sensor for determining ground speed at which the vehicle is traveling;
   means for determining transmission gear placement of the vehicle; and
   a processor for comparing the ground speed, engine speed and transmission gear placement to determine if the engine speed is too high for a given ground speed and transmission gear placement and generating a warning signal on an output of the processor if the engine speed is too high.

2. The system according to claim 1 wherein the first sensor is a variable reluctance sensor.

3. The system according to claim 1 wherein the second sensor is a hall effect speed sensor.

4. The system according to claim 1 further comprising an indicator coupled to the output of the processor wherein the indicator is activated if a warning signal is present at the output of the signal processor.

5. The system according to claim 4 wherein the indicator is a light located on the vehicle.

6. The system according to claim 5 wherein the light is located on an instrument cluster of the vehicle.

7. The system according to claim 1 wherein the vehicle is an All Terrain Vehicle.

8. A system for warning an operator of a vehicle if the vehicle is operating in a condition that may result in drive belt failure, the system comprising:
   means for determining engine speed of the vehicle;
   means for determining ground speed at which the vehicle is traveling;
   means for determining transmission gear placement of the vehicle; and
   means for comparing the ground speed, engine speed and transmission gear placement to determine if the engine speed is too high for a given ground speed and transmission gear placement and generating a warning signal if the engine speed is too high.

9. The system according to claim 8 wherein the means for determining engine speed is an engine speed sensor.

10. The system according to claim 8 wherein the means for determining engine speed is a Hall effect sensor.

11. The system according to claim 8 wherein the means for determining engine speed is a variable reluctance sensor.

12. The system according to claim 8 wherein the means for determining ground speed is a ground speed sensor.

13. The system according to claim 8 wherein the means for determining ground speed is a Hall effect sensor.

14. The system according to claim 8 further comprising an indicator coupled to the output of the processor wherein the indicator is activated if a warning signal is present at the output of the signal processor.

15. The system according to claim 14 wherein the indicator is a light located on the vehicle.

16. The system according to claim 15 wherein the light is located on an instrument cluster of the vehicle.

17. The system according to claim 14 wherein the indicator is an alphanumeric display.

18. A system for warning an operator of a vehicle if the vehicle is operating in a condition that may result in drive belt failure, the system comprising:
   a first sensor for determining engine speed of the vehicle;
   a second sensor for determining ground speed at which the vehicle is traveling;
   a signal processor operatively coupled to the first and second sensors to receive outputs of the first and second sensors as inputs to the signal processor, the signal processor programmed to compare the ground speed, engine speed and transmission gear placement to determine if the engine speed is too high for a given ground speed and the transmission gear placement and generate a warning signal as an output of the signal processor if the engine speed is too high; and
   an indicator coupled to the output of the signal processor wherein the indicator is activated by the warning signal generated by the signal processor.

19. A system according to claim 18 wherein the indicator is a light located on the vehicle.

20. A system according to claim 19 wherein the light is located on an instrument panel of the vehicle.

21. A system according to claim 18 further comprising a lookup table stored in a memory of the signal processor, the lookup table associating a particular range of engine speeds with a particular range of ground speeds for a given transmission gear placement wherein the lookup table is used by the signal processor to perform the comparison.

22. A system according to claim 20 wherein the signal processor determines if the measured ground speed is lower than the particular range of ground speeds associated with the range of engine speeds in which the measured engine speed falls, and if so, the signal processor generates the warning signal.

23. The system according to claim 18 wherein the first sensor is an engine speed sensor.

24. The system according to claim 18 wherein the first sensor is a Hall effect sensor.

25. The system according to claim 18 wherein the first sensor is a variable reluctance sensor.

26. The system according to claim 18 wherein the second sensor is a ground speed sensor speedometer.

27. The system according to claim 18 wherein the second sensor is a Hall effect sensor.

28. The system according to claim 18 wherein the warning is not generated unless the engine speed remains too high for at least a prescribed period of time.

29. The system according to claim 28 wherein the prescribed period of time ranges from about 1 second to about 20 seconds.

30. A method for warning an operator of a vehicle if the vehicle is operating in a condition that may result in drive belt failure, the method comprising the steps of:
   determining engine speed of the vehicle;
   determining ground speed at which the vehicle is traveling;
   determining placement of a transmission gear of the vehicle; and
   comparing the ground speed, engine speed and transmission gear placement to determine if the engine speed is too high for a given ground speed and transmission gear placement; and
   generating a warning if the engine speed is too high.

31. The method according to claim 30 further comprising the step of providing an indication to the operator that the engine speed is too high.

32. The method according to claim 31 wherein the step of providing an indication comprises illuminating a warning light.

33. The method according to claim 31 wherein the step of providing an indication comprises activating an alphanumeric display.

34. The method according to claim 30 wherein the step of generating the warning does not occur unless the engine speed has been to high for at least a prescribed period of time.

* * * * *